US012431345B2

(12) United States Patent
Takeshita

(10) Patent No.: US 12,431,345 B2
(45) Date of Patent: Sep. 30, 2025

(54) MASS SPECTROMETRY METHOD AND MASS SPECTROMETER

(71) Applicant: SHIMADZU CORPORATION, Kyoto (JP)

(72) Inventor: Kengo Takeshita, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 462 days.

(21) Appl. No.: 17/920,252

(22) PCT Filed: May 27, 2020

(86) PCT No.: PCT/JP2020/020958
§ 371 (c)(1),
(2) Date: Oct. 20, 2022

(87) PCT Pub. No.: WO2021/240693
PCT Pub. Date: Dec. 2, 2021

(65) Prior Publication Data
US 2023/0162957 A1 May 25, 2023

(51) Int. Cl.
*H01J 49/04* (2006.01)

(52) U.S. Cl.
CPC ................................ *H01J 49/0409* (2013.01)

(58) Field of Classification Search
USPC .................................... 250/281, 282, 442.11
See application file for complete search history.

(56) References Cited

U.S. PATENT DOCUMENTS

| | | | | |
|---|---|---|---|---|
| 2012/0104247 | A1 | 5/2012 | Ogawa et al. | |
| 2013/0080072 | A1 | 3/2013 | Ikegami | |
| 2021/0118661 | A1* | 4/2021 | Corkum | H01J 49/0463 |
| 2021/0333173 | A1* | 10/2021 | Sandkuijl | H01J 49/0004 |

FOREIGN PATENT DOCUMENTS

| | | | |
|---|---|---|---|
| JP | 2013-068565 | A | 4/2013 |
| WO | 2010/113209 | A1 | 10/2010 |

OTHER PUBLICATIONS

International Search Report for PCT/JP2020/020958 dated, Jul. 14, 2020 (PCT/ISA/210).
Written Opinion of the International Searching Authority for PCT/JP2020/020958 dated, Jul. 14, 2020 (PCT/ISA/237).

* cited by examiner

*Primary Examiner* — Kiet T Nguyen
(74) *Attorney, Agent, or Firm* — Sughrue Mion, PLLC

(57) ABSTRACT

A mass spectrometry method using a mass spectrometer 1 including a first moving mechanism 151 configured to move a sample stage 14 in a first direction in a plane parallel to the sample stage 14 and a second moving mechanism 152 configured to move the first moving mechanism 151 in a second direction different from the first direction in a plane parallel to the sample stage 14. The mass spectrometry method causes an irradiation point of excitation beam to be intermittently moved between a plurality of measurement points two-dimensionally arranged on a sample placed on the sample stage 14 with the first direction as a main movement direction (Step 4), and performs mass spectrometry at each of a plurality of the measurement points (Step 5).

6 Claims, 4 Drawing Sheets

MASS SPECTROMETRY METHOD AND MASS SPECTROMETER

CROSS REFERENCE TO RELATED APPLICATIONS

This application is a National Stage of International Application No. PCT/JP2020/020958 filed May 27, 2020.

TECHNICAL FIELD

The present invention relates to a mass spectrometry method and a mass spectrometer.

BACKGROUND ART

An imaging mass spectrometer is used to measure distribution of a target substance in a sample such as a cell. In the imaging mass spectrometer, in order to measure distribution of a target substance in a target region of a sample surface, a plurality of measurement points two-dimensionally arranged in the region are set. Then, laser light is spotted on the sample surface, the spotted point is sequentially moved through the plurality of measurement points, and the substance present at each measurement point is ionized and subjected to mass spectrometry. This movement is performed intermittently. That is, movement is stopped at each measurement point, and irradiation with pulse laser is performed a plurality of times (for example, several tens to several hundreds of times). Mass spectrum data of each measurement point is obtained by integrating mass spectrum data acquired by the plurality of times of the mass spectrometry. From the mass spectrum data of each measurement point thus obtained, the intensity of a mass peak at the mass-to-charge ratio of an ion characteristic to the target substance is obtained. The intensity of the mass peak at each measurement point is mapped on the target region to create an image, which shows the distribution of the target substance in the target region on the sample surface (for example, Patent Literature 1).

In an imaging mass spectrometer, light emitted from a laser light source is condensed by a condenser lens, and a surface of a sample placed on a sample stage is irradiated with the condensed light. The sample stage is configured to be movable, for example, in three dimensions including two (x and y directions) in a plane parallel to the surface of the sample stage and one (z direction) perpendicular to the surface. Movement in the x and y directions and movement in the z direction are performed by independent moving mechanisms. In this case, the sample stage is first fixed to the moving mechanism of the z direction, and the moving mechanism of the z direction is placed on the moving mechanism of the x and y directions, for example.

When measurement of two-dimensionally arranged measurement points is performed, the measurement is generally started from a measurement point located at an end First, the measurement start point is placed at the laser beam irradiation position, where the pulsed laser beam is repeatedly irradiated a predetermined number of times and mass spectrometry is performed. When mass spectrometry at the measurement start point is completed, the sample stage is moved in a first direction (main movement direction) which is one direction of the two-dimensional arrangement, and a second measurement point is stopped at the irradiation position of the pulsed laser light. Then, similarly to the measurement start point, mass spectrometry measurements are repeatedly performed a predetermined number of times by irradiation with pulsed laser light. In this way, when the sample stage is intermittently moved along the main movement direction and mass spectrometry at the last measurement point in the main movement direction is completed, the sample stage is moved in a second direction (sub movement direction) which is the other direction of the two-dimensional arrangement, and measurements are performed at a measurement point adjacent to the last measurement point. Then, mass spectrometry of each measurement point is performed again along the main movement direction.

CITATION LIST

Patent Literature

Patent Literature 1: JP 2013-068565 A

SUMMARY OF INVENTION

Technical Problem

In recent years, a laser light source which is capable of condensing laser light at a small diameter of about 5 μm has been developed. Imaging mass spectrometry with higher spatial resolution becomes possible by using laser light condensed to a small diameter. A laser light source which is capable of emitting pulsed laser light at a high frequency of several tens of kHz (repetition frequency of pulsed laser light) has been developed. Since time required for mass spectrometry at each measurement point is shortened by using pulsed laser light of high frequency, imaging mass spectrometry of a larger sample is becoming possible.

In order to shorten imaging mass spectrometry time, it is necessary to increase the moving speed of a sample stage. However, when acceleration applied to the sample stage is increased in order to speed up movement between measurement points, large vibration occurs when the sample stage is stopped at a next measurement point. When pulsed laser light is applied a plurality of times while the sample stage is in a vibrating state, there is a problem that the irradiation position is shifted every time irradiation is performed, and spatial resolution of imaging mass spectrometry is deteriorated.

Here, the case where laser light is used as an excitation beam for ionizing a substance present on a sample surface is described as an example. However, the same problem as described above also occurs in a case where another type of excitation beam such as an electron beam is used.

A problem to be solved by the present invention is to provide a technique by which imaging mass spectrometry can be speeded up while spatial resolution of the imaging mass spectrometry is maintained.

Solution to Problem

The present invention made to solve the above problem is a mass spectrometry method using a mass spectrometer including a first moving mechanism configured to move a sample stage in a first direction in a plane parallel to the sample stage and a second moving mechanism configured to move the first moving mechanism in a second direction different from the first direction in the plane parallel to the sample stage, the mass spectrometry method comprising:

- moving the sample stage in the first direction with the first moving mechanism to cause an irradiation point of excitation beam to be intermittently moved between a plurality of measurement points two-dimensionally arranged on a sample placed on the sample stage with the first direction as a main movement direction, and performing mass spectrometry at each of the plurality of measurement points.

Further, a mass spectrometer according to the present invention made to solve the above problem includes:

a sample stage on which a sample is placed;

a first moving mechanism configured to move the sample stage in a first direction in a plane parallel to the sample stage;

a second moving mechanism configured to move the first moving mechanism in a second direction different from the first direction in the plane parallel to the sample stage;

an excitation beam optical system configured to irradiate the sample stage with an excitation beam; and a measurement control unit configured to move the sample stage in the first direction with the first moving mechanism to cause an irradiation point of the excitation beam to be intermittently moved between a plurality of measurement points two-dimensionally arranged on a sample placed on the sample stage with the first direction as a main movement direction, and perform mass spectrometry at each of the plurality of measurement points.

Advantageous Effects of Invention

The present invention performs mass spectrometry using a mass spectrometer including a first moving mechanism that moves a sample stage in a first direction in a plane parallel to the sample stage and a second moving mechanism that moves the first moving mechanism in a second direction different from the first direction in the plane parallel to the sample stage. In the present invention, by mean of the first moving mechanism, an irradiation point of an excitation beam is intermittently moved between a plurality of measurement points two-dimensionally arranged on a sample placed on the sample stage with the first direction as a main movement direction, and mass spectrometry is performed at each of a plurality of the measurement points. That is, after mass spectrometry is performed at a measurement start point, by moving the sample stage in the first direction with the first moving mechanism, operation of moving an irradiation point of an excitation beam from the measurement start point to a measurement point adjacent in the main movement direction to perform mass spectrometry is repeatedly performed. When mass spectrometry at a last measurement point in the main movement direction is completed, the sample stage is moved to the other direction of the two-dimensional arrangement (second direction or sub movement direction), and measurement is performed at a measurement point adjacent to the last measurement point. After the above, mass spectrometry of each measurement point is performed again along the main movement direction.

The second moving mechanism moves both the sample stage and the first moving mechanism. In contrast, the first moving mechanism moves only the sample stage and the load during the movement is small. Vibration generated when the sample stage is stopped is smaller when the sample stage is moved in the first direction than when the sample stage is moved in the second direction. Therefore, even if acceleration is increased during movement of the sample stage in the first direction, vibration when the sample stage is stopped during movement between measurement points is suppressed to be small, and the irradiation position of an excitation beam is hardly shifted. Therefore, the imaging mass spectrometry can be speeded up while spatial resolution of the imaging mass spectrometry is maintained.

DESCRIPTION OF EMBODIMENTS

An imaging mass spectrometry method and an imaging mass spectrometer, which are embodiments of a mass spectrometry method and a mass spectrometer according to the present invention, will be described below with reference to the drawings.

An imaging mass spectrometer 1 of the present embodiment generates ions by a matrix assisted laser desorption/ionization: MALDI) method and performs mass spectrometry, and generates ions at each of a plurality of measurement points on a surface of a sample placed on a sample stage and performs mass spectrometry.

Figure 1:
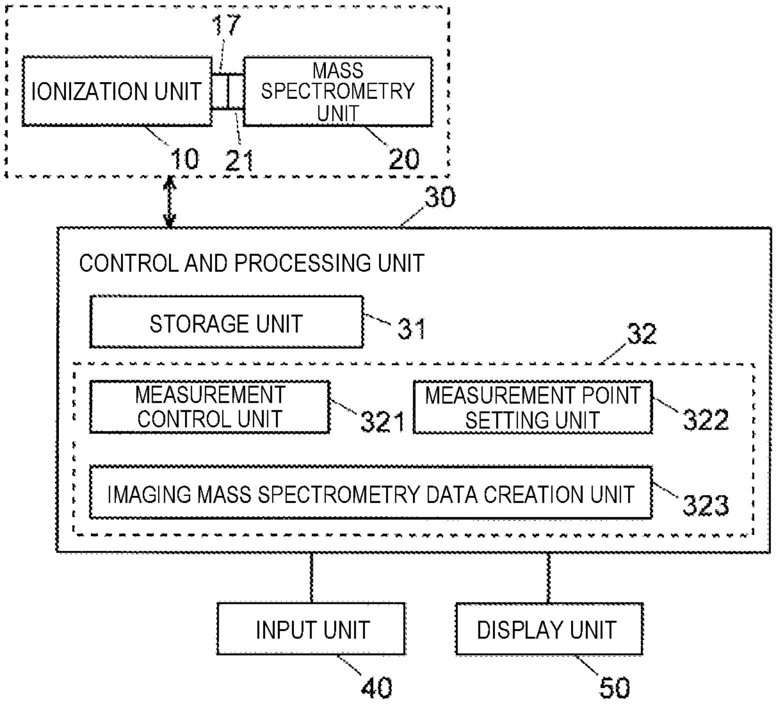
FIG. 1 is a configuration diagram of a main part of an imaging mass spectrometer as an embodiment of a mass spectrometer according to the present invention.

As illustrated in a block diagram in FIG. 1, the imaging mass spectrometer 1 roughly includes an ionization unit 10, a mass spectrometry unit 20, and a control and processing unit 30. The ionization unit 10 is detachably attached to the mass spectrometry unit 20.

Figure 2:
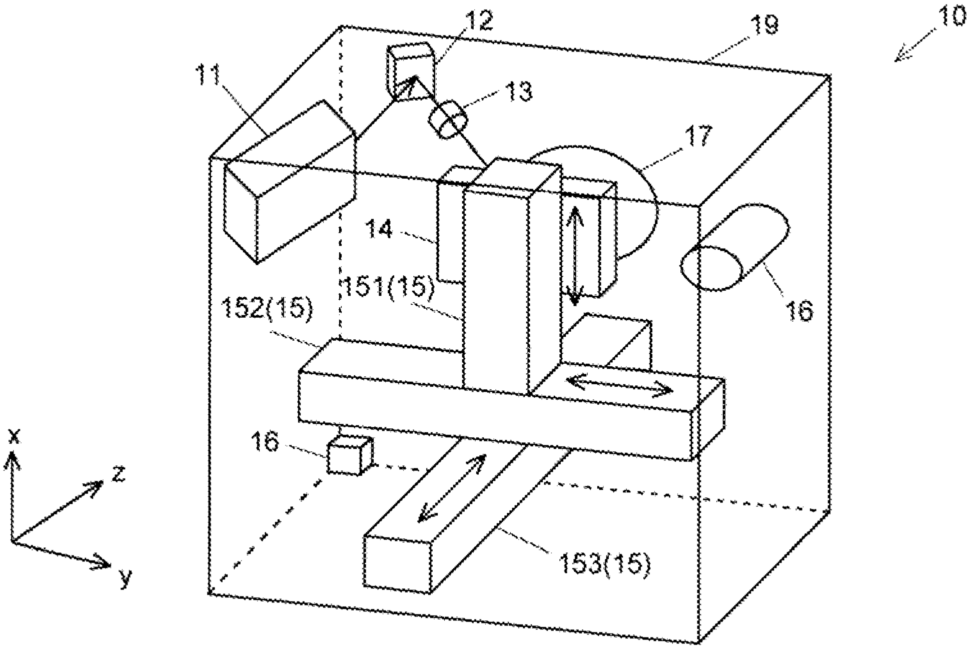
FIG. 2 is a diagram illustrating a schematic configuration of an ionization unit of the imaging mass spectrometer of the present embodiment.

FIG. 2 illustrates a schematic configuration of the ionization unit 10. The ionization unit 10 includes a laser light source 11, a reflecting mirror 12, and a condenser lens 13. The laser light source 11, the reflecting mirror 12, and the condenser lens 13 (hereinafter, also referred to as "excitation beam optical system") are fixed to a housing 19 directly or indirectly via a holding member (frame).

Further, the ionization unit 10 includes a sample stage 14, a stage moving mechanism 15, and a microscope 16. An opening 17 is formed on one side surface of the housing 19. The stage moving mechanism 15 is fixed to the housing 19.

The sample stage 14 is movable in three directions orthogonal to each other by the stage moving mechanism 15. The stage moving mechanism 15 includes a first linear guide 151 for moving the sample stage 14 in a vertical direction (x direction), a second linear guide 152 for moving the sample stage 14 and the first linear guide 151 in a horizontal direction (y direction), a third linear guide 153 for moving the sample stage 14, the first linear guide 151, and the second linear guide 152 in the horizontal direction (z direction), and a drive source for operating them. The drive source includes, for example, a stepping motor.

Further, in the housing 19, the microscope 16 for observing a sample placed on the sample stage 14 is provided. The user moves the sample stage 14 to an observation position (in front of the microscope 16) and observes a sample surface with the microscope 16, so as to set a region of interest of the sample as a target region. Further, a plurality of measurement points are set in the target region.

When the imaging mass spectrometer is executed, the sample stage 14 is moved so that the target region of the sample surface is located in front of the opening 17 formed on the side surface of the housing 19. Then, light emitted from the laser light source 11 and reflected by the reflecting mirror 12 is condensed by the condenser lens 13, and a measurement point in the target region of a sample surface is irradiated with the light. Ions generated from the sample by the irradiation of the laser light are emitted from the opening 17 to the outside of the housing 19.

The ionization unit 10 is detachably attached to the mass spectrometry unit 20. An opening 21 is formed at a position corresponding to the opening 17 of the ionization unit 10 on a side surface of the housing of the mass spectrometry unit 20 on a side to which the ionization unit 10 is attached. The mass spectrometry unit 20 performs mass spectrometry of ions incident through the opening 21. The mass spectrometry unit 20 accommodates an ion optical system such as an ion lens that focuses incident ions, a mass separation unit such as a quadrupole mass filter that separates ions focused by the ion optical system according to a mass-to-charge ratio, and an ion detector that detects ions separated by the mass separation unit.

The control and processing unit 30 controls operation of the ionization unit 10 and the mass spectrometry unit 20, and performs processing such as creation of imaging mass spectrometry data on the basis of an output signal from the ion detector of the mass spectrometry unit 20. The control and processing unit 30 includes a measurement control unit 321, a measurement point setting unit 322, and an imaging mass spectrometry data creation unit 323 as functional blocks in addition to a storage unit 31. The substance of the control and processing unit 30 is a general computer, and functions of the measurement control unit 321, the measurement point setting unit 322, and the imaging mass spectrometry data creation unit 323 are embodied as mass spectrometry software 32 installed in advance is executed by a processor. Further, an input unit 40 for the user to perform appropriate input operation and a display unit 50 for displaying various types of information are connected to the control and processing unit 30.

Figure 3:
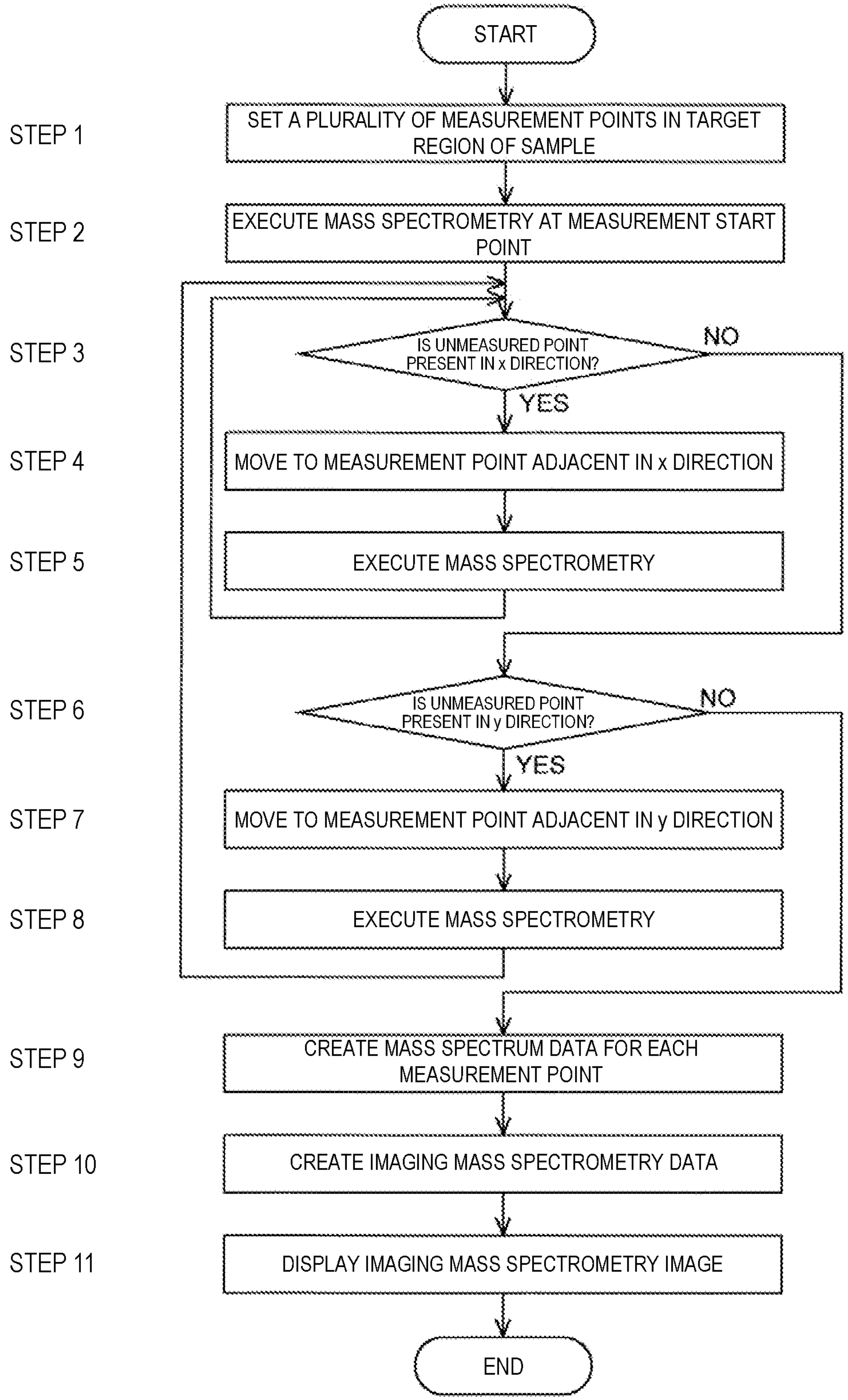
FIG. 3 is a flowchart of an imaging mass spectrometry method which is an embodiment of a mass spectrometry method according to the present invention.

The present embodiment is characterized in the order of executing mass spectrometry of a plurality of measurement points set in a region of interest on a sample surface when imaging mass spectrometry is performed. The process of imaging mass spectrometry in the present embodiment will be described with reference to a flowchart of FIG. 3.

The user sets a sample on the sample stage 14 prior to execution of imaging mass spectrometry. This sample is prepared, for example, by applying a matrix substance that easily absorbs laser light to a section cut out from a biological sample. When the user performs predetermined input operation for instructing start of imaging mass spectrometry, the measurement control unit 321 operates the stage moving mechanism 15 to move the sample stage 14 to the observation position (front of the microscope 16). Then, an observation image of the sample surface is acquired by the microscope 16, and the observation image is displayed on a screen of the display unit 50.

The user checks the observation image displayed on the screen of the display unit 50, and sets a region of interest, which is a region to be subjected to imaging mass spectrometry, on the sample surface. The size of the region of interest can be, for example, 20 mm square in distance on the surface of the sample. When the user sets the region of interest, the measurement control unit 321 stores the region of interest in the storage unit 31 as a target region together with the observation image of the sample surface.

When the target region of the sample is stored, the measurement point setting unit 322 displays a screen for setting a plurality of measurement points in the target region on the display unit 50. This screen is provided with, for example, a field for inputting an interval between measurement points to be set in the target region, and when the user inputs the interval between measurement points in the field, a plurality of measurement points are set in the target region based on the input value (Step 1). This input value can be, for example, 5 to 20 μm in distance on the surface of the sample. Specifically, for example, a plurality of measurement points separated by a distance of the input value are two-dimensionally set in two directions orthogonal to each other in the target region with a predetermined measurement start point (a point in a corner portion of a rectangular target region) as a starting point. The measurement points can also be set by inputting the number of measurement points (for example, the number of measurement points in each of two directions orthogonal to each other in the target region).

When a plurality of measurement points two-dimensionally arranged in the target region are set, the measurement control unit 321 operates the stage moving mechanism 15 again, and stops the stage moving mechanism 15 by setting a measurement start point to an irradiation position of laser light by an excitation beam irradiation system.

Next, the measurement start point is irradiated with pulsed laser light, ions generated from the measurement start point are taken into the mass spectrometry unit 20 through the openings 17 and 21, separated according to a mass-to-charge ratio, and measured (Step 2). A detection signal of the ions obtained by the mass spectrometry unit 20 is stored in the storage unit 31 in association with position information of the measurement start point. At the measurement start point, pulsed laser light is emitted one or a plurality of times, and ions generated by the irradiation are subjected to mass spectrometry. For example, irradiation with pulsed laser light is performed ten to several hundred times, and mass spectrometry is performed for each of one or a plurality of times of irradiation with pulsed laser light.

When the mass spectrometry at the measurement start point is completed, the measurement control unit 321 checks whether mass spectrometry of a measurement point located in an end portion in the x direction is completed. At this time point, only the mass spectrometry of the measurement start point is completed, and there is an unmeasured point located in the x direction from the measurement start point (YES in Step 3). When there is an unmeasured point adjacent in the x direction as described above, the sample stage 14 is moved in the x direction along the first linear guide 151, and is stopped as a next measurement point is set to the irradiation position of laser light (Step 4). Then, similarly to the measurement start point, irradiation of pulsed laser light and mass spectrometry of ions generated by the irradiation are also performed at this measurement point (Step 5), and a detection signal of the ions obtained by the mass spectrometry unit 20 is stored in the storage unit 31 in association with position information of the measurement point.

For a third and subsequent measurement points, presence or absence of an unmeasured point adjacent in the x direction is sequentially determined in the same manner as described above, and in a case where there is an unmeasured point (YES in Step 3), the sample stage 14 is moved and stopped in the x direction along the first linear guide (Step 4), irradiation with pulsed laser light and mass spectrometry are performed (Step 5), and a detection signal of ions is stored in the storage unit 31 in association with position information of the measurement point.

When mass spectrometry is finished for a last measurement point adjacent in the x direction from the measurement start point (that is, there is no unmeasured point adjacent in the x direction: NO in Step 3), the measurement control unit 321 checks presence or absence of an unmeasured point adjacent in the y direction from the measurement point. Then, in a case where there is an unmeasured point adjacent in the y direction (YES in Step 6), the sample stage is moved in the y direction along the second linear guide 152, and stopped by setting a measurement point adjacent in the y direction from the last measurement point to the irradiation position of laser light (Step 7). Then, irradiation of pulsed laser light and mass spectrometry of ions generated by the irradiation are performed at the measurement point (Step 8), and a detection signal of the ions obtained by the mass spectrometry unit 20 is stored in the storage unit 31 in association with position information of the measurement point.

After the above, the processing of Steps 3 to 8 is repeatedly performed in the same manner as described above. Then, when there is no unmeasured point in both the x direction and the y direction (NO in Step 3, and NO in Step 6), the measurement ends.

When mass spectrometry at all of a plurality of measurement points is completed, the imaging mass spectrometry data creation unit 323 reads a detection signal of ions at each measurement point stored in the storage unit 31, and creates mass spectrum data for each measurement point (Step 9). In a case where mass spectrometry is performed a plurality of times at each measurement point, mass spectrum data is created by integrating detection signals of ions for each measurement point. Furthermore, the imaging mass spectrometry data creation unit 323 creates imaging mass spectrometry data in which mass spectrum data of each measurement point is mapped to a target region according to position information of the measurement point (Step 10).

After creation of the imaging mass spectrometry data, when the user inputs a mass-to-charge ratio of ions, the imaging mass spectrometry data creation unit 323 reads detection intensity of the ions of the mass-to-charge ratio at each measurement point, and displays a mass spectrometry image in which a color corresponding to the intensity is mapped to the target region (Step 11). The user can know how a substance to be analyzed is distributed on a sample surface by inputting a mass-to-charge ratio of ions characteristic of the substance.

In the present embodiment, when mass spectrometry of the plurality of measurement points set two-dimensionally in the target region of the sample surface is performed, first, the sample stage 14 is repeatedly moved and stopped along the first linear guide 151 that moves only the sample stage 14, and mass spectrometry is performed by setting each measurement point adjacent in the x direction to an irradiation position of the laser light. When mass spectrometry of all measurement points adjacent in the x direction is completed, the sample stage 14 is moved in they direction along the second linear guide 152. Then, the sample stage 14 is repeatedly moved and stopped along the first linear guide 151 that moves only the sample stage 14 again, and mass spectrometry is performed by setting each measurement point adjacent in the x direction to a condensing position of laser light. That is, in the present embodiment, the irradiation point of laser light is intermittently moved between the plurality of measurement points two-dimensionally arranged on the sample placed on the sample stage 14 with the x direction that is a movement direction of the sample stage 14 by the first linear guide 151 as a main movement direction, and mass spectrometry is performed at each of the plurality of the measurement points.

Here, the main movement direction can be defined as a direction in which the number of times of movement is larger or a direction in which a total moving distance is longer when the sample stage 14 is moved in two directions and an irradiation point of excitation beam is intermittently moved between a plurality of measurement points two-dimensionally arranged on a sample placed on the sample stage to perform mass spectrometry at each of a plurality of the measurement points. Further, the main movement direction can also be defined as a direction in which three or more adjacent measurement points are sequentially subjected to mass spectrometry (typically, a direction in which adjacent measurement points are sequentially subjected to mass spectrometry from one end to the other end) when the sample stage 14 is moved in two directions to intermittently move an irradiation point of an excitation beam between a plurality of measurement points two-dimensionally arranged on a sample placed on the sample stage and mass spectrometry is performed at each of a plurality of the measurement points.

The second linear guide 152 moves both the sample stage 14 and the first linear guide 151, whereas the first linear guide 151 moves only the sample stage 14 and load during the movement is small. Vibration generated when the sample stage 14 is stopped is smaller when the sample stage 14 is moved in the x direction by the first linear guide than when the sample stage 14 is moved in the y direction by the second linear guide 152. Therefore, when acceleration is increased during movement of the sample stage in the x direction, vibration at the time of stopping the sample stage 14 during movement between measurement points is suppressed to be small, and an irradiation position of laser light is hardly shifted.

In order to suppress the vibration at the time of movement of the sample stage 14 in the y direction, acceleration at the time of the movement of the sample stage 14 in the y direction only needs to be suppressed to be smaller than that at the time of the movement in the x direction. Since the number of times of movement of the sample stage 14 in the y direction is smaller than the number of times of movement of the sample stage 14 in the x direction. Even if the acceleration at the time of the movement of the sample stage 14 in the y direction is suppressed to be small, influence on total execution time of imaging mass spectrometry is small. For example, in a case where 100-by-100 measurement points are set in a target region of a sample and mass spectrometry is performed as in the above embodiment, the number of times of movement of the sample stage 14 in the x direction is 9900, whereas the number of times of movement of the sample stage 14 in the y direction is as small as 100. Even if movement time of the sample stage 14 in they direction is five times as long as movement time of the sample stage 14 in the x direction as a result of making acceleration at the time of the movement of the sample stage 14 in the y direction smaller than acceleration at the time of the movement of the sample stage 14 in the x direction, movement time of the sample stage 14 in entire imaging mass spectrometry increases only by about 4%. When the number of measurement points arranged in the x direction is large, the above influence is smaller. In a case where the number of measurement points is small, time required for imaging mass spectrometry itself is not so long, so that it is not necessary to discuss movement time of the sample stage 14.

In order to make acceleration at the time of movement of the sample stage 14 smaller than that at the time of movement in the x direction, the first linear guide 151 and the second linear guide 152 having different configurations only need to be used. Alternatively, the first linear guide 151 and the second linear guide 152 having the same configuration may be used, and control signals of different forms may be transmitted from the measurement control unit 321 to both the linear guides.

Note that reducing weight of a component that generate load when the sample stage 14 moves is also effective for reducing vibration. In the above embodiment. If such a component is reduced in weight, it is possible to suppress vibration of the sample stage 14 while further increasing acceleration of the sample stage 14. Further, it is also effective to increase rigidity of the stage itself. However, these measures are not essential in the present invention, and may be appropriately performed as necessary and in consideration of cost.

Hereinafter, a result of an experiment for confirming an effect obtained by the mass spectrometry method and the mass spectrometer of the present embodiment will be described.

Figure 4:
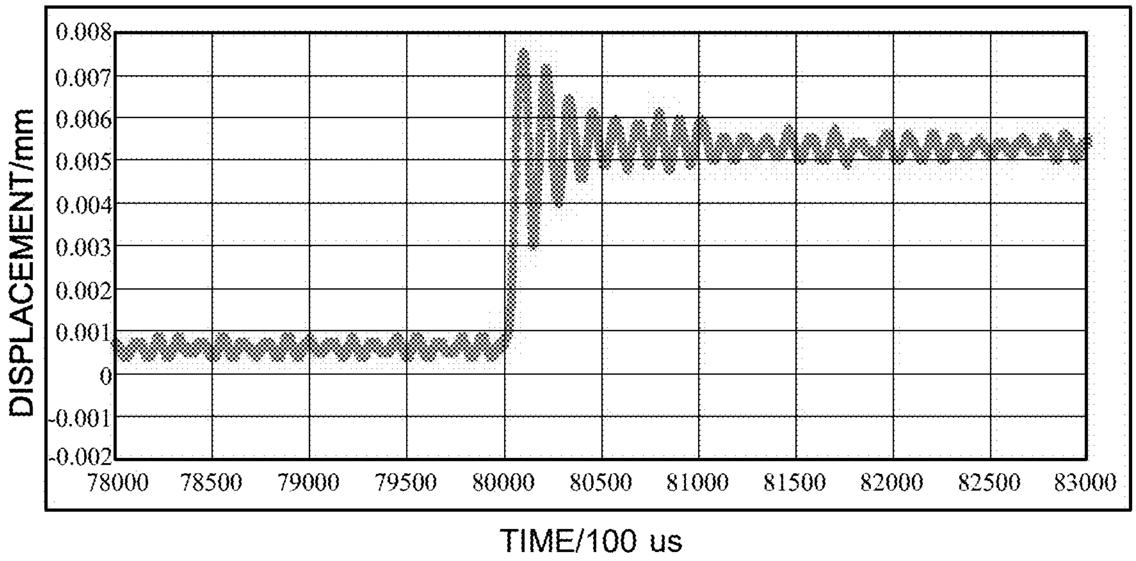
FIG. 4 is a graph showing a change in magnitude of vibration generated when a sample stage is stopped in a conventional mass spectrometry method.

FIG. 4 illustrates magnitude of vibration generated when a sample stage is moved and stopped by a conventional imaging mass spectrometry method measured with a laser displacement meter. In FIG. 4, the stage moving mechanism 15 similar to that in the above embodiment is used, and the sample stage 14 is moved with the y direction, which is the movement direction of the sample stage 14 by the second linear guide 152, as the main direction. In such a conventional mass spectrometry method, a sample stage position vibrates by up to about ±2 μm until about 50 msec elapses after the sample stage is stopped. When the sample stage is irradiated with pulsed laser light at a high speed of several tens of kHz while vibrating in this manner, an irradiation position of the laser light varies by ±2 μm at the maximum. That is, the irradiation position of the laser light is shifted by up to 4 μm, and even if the laser is condensed to 5 μm or less, spatial resolution matching such condensation is not obtained.

In order to avoid deterioration of spatial resolution as described above, it has conventionally been necessary to wait until vibration of the sample stage attenuates or to reduce a repetition frequency of pulsed laser light, which has been a factor that hinders speeding up of imaging mass spectrometry. Note that some conventional imaging mass spectrometers perform mass spectrometry with a direction in which a sample stage is moved by a moving mechanism located at a lowermost position among moving mechanisms that move the sample stage in three directions as the main direction. In such an imaging mass spectrometer, when the sample stage is moved and stopped in the main direction, two moving mechanisms are simultaneously moved and stopped (that is, the number of moving mechanisms that are moved and stopped is larger by one than that in the above-described conventional example). Therefore, load generated when the sample stage is moved and stopped is larger than that in the conventional example described above, and it is easily estimated that larger vibration than that shown in FIG. 4 occurs.

Figure 5:
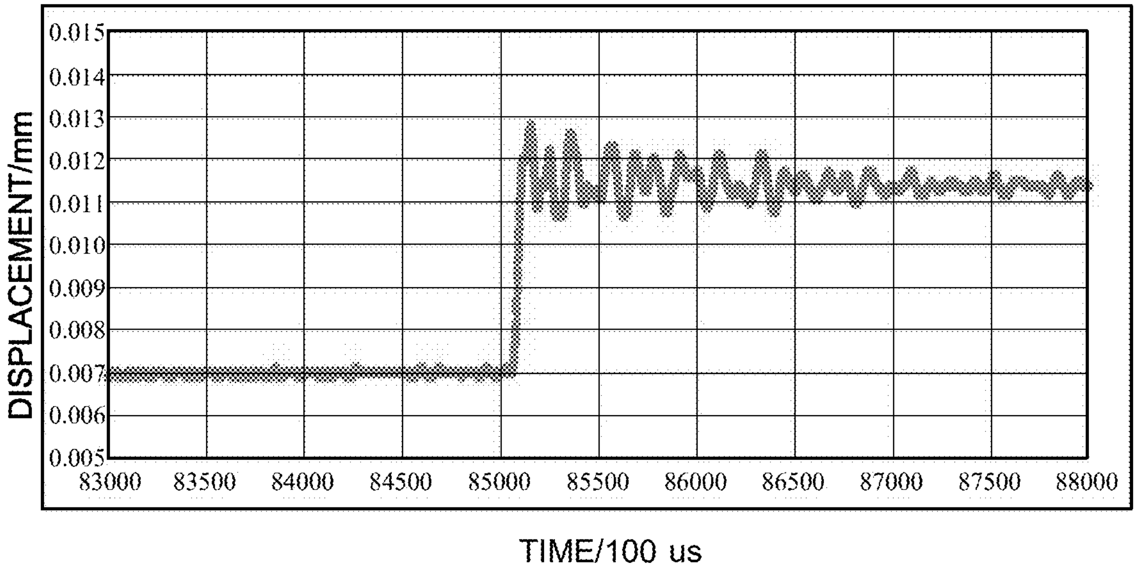
FIG. 5 is a graph showing a change in magnitude of vibration generated when a sample stage is stopped in a mass spectrometry method of the present embodiment.

FIG. 5 illustrates magnitude of vibration generated when a sample stage is moved and stopped by the imaging mass spectrometry method of the above embodiment measured with a laser displacement meter. From a comparison with FIG. 4, it can be seen that the magnitude of the vibration generated when the sample stage 14 is stopped is reduced to about half of that of the conventional example.

The above-described embodiment is merely an example, and can be appropriately modified in accordance with the spirit of the invention. In the above embodiment, the measurement control unit 321 controls operation of the stage moving mechanism 15 to move the sample stage 14, but the user may move the sample stage 14 by operating the stage moving mechanism 15 by himself or herself.

Figure 6:
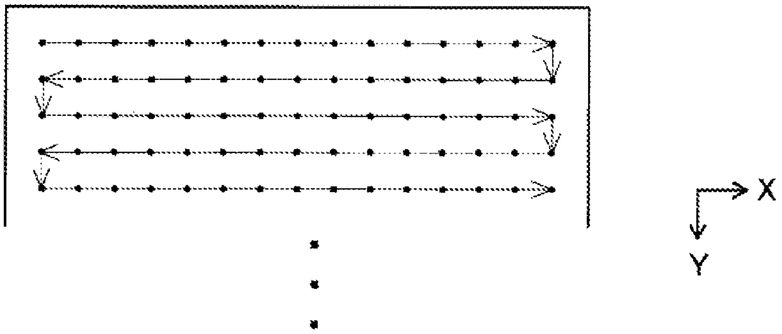
FIG. 6 is a diagram explaining movement order between measurement points in the mass spectrometry method of the present embodiment.
Figure 7:
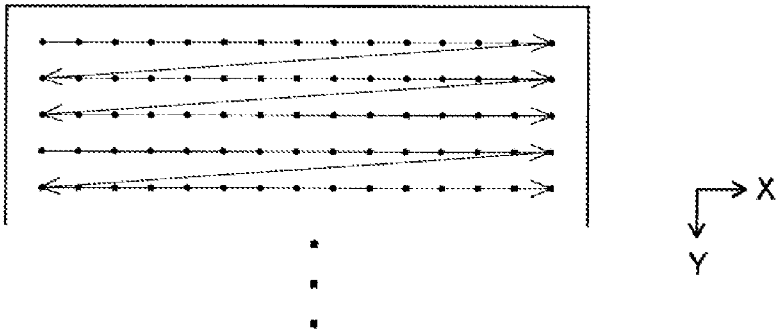
FIG. 7 is a diagram for explaining another example relating to the movement order between measurement points.

In the above embodiment, as illustrated in FIG. 6, mass spectrometry is performed by sequential movement from a measurement start point to a measurement point adjacent in a positive direction of the x axis, and after movement from a measurement point located in an end portion in the x direction to a measurement point adjacent in the y direction, mass spectrometry is performed by sequential movement to a measurement point adjacent in a negative direction of the x axis, but the order of movement between measurement points is not limited to the above. For example, as illustrated in FIG. 7, after measurement points arranged in the x direction are subjected to mass spectrometry from a first end side to a second end side, movement may be made to a measurement point adjacent in the y direction to a measurement point on the first end side, and the measurement points arranged in the x direction may be subjected to mass spectrometry from the first end side to the second end side in order from the measurement point (that is, mass spectrometry is performed by movement to a plurality of measurement points at the same position in the y direction only in the positive direction of the x axis). Further, in FIGS. 6 and 7, the example in which a plurality of measurement points are arranged in a lattice shape is illustrated, but measurement points can also be arranged in a honeycomb shape or the like.

Furthermore, in the above embodiment, the ionization unit 10 is configured such that a stage surface of the sample stage 14 is a vertical surface, but the ionization unit 10 may be configured such that the stage surface is a horizontal surface.

In the above embodiment, ions are generated by the MALDI method and subjected to mass spectrometry, but the same configuration as described above can also be used in a case where ions are generated by a laser desorption ionization (LDI) method without using a matrix substance. Further, in the above embodiment, a substance on a sample surface is ionized using laser light, but the same configuration as that in the above embodiment can also be used in a case where another type of excitation beam such as an electron beam is used.

[Mode]

It will be understood by those skilled in the art that a plurality of the exemplary embodiments described above are specific examples of a mode described below.

Clause 1

One mode is a mass spectrometry method using a mass spectrometer including a first moving mechanism configured to move a sample stage in a first direction in a plane parallel to the sample stage and a second moving mechanism configured to move the first moving mechanism in a second direction different from the first direction in the plane parallel to the sample stage, the mass spectrometry method comprising:

moving the sample stage in the first direction with the first moving mechanism to cause an irradiation point of excitation beam to be intermittently moved between a plurality of measurement points two-dimensionally arranged on a sample placed on the sample stage with the first direction as a main movement direction, and performing mass spectrometry at each of a plurality of the measurement points.

Clause 2

A mass spectrometer as another mode includes:

a sample stage on which a sample is placed;

a first moving mechanism configured to move the sample stage in the first direction in a plane parallel to the sample stage;

a second moving mechanism configured to move the first moving mechanism in a second direction different from the first direction in the plane parallel to the sample stage;

an excitation beam optical system configured to irradiate the sample stage with an excitation beam; and a measurement control unit configured to move the sample stage in the first direction with the first moving mechanism to cause an irradiation point of the excitation beam to be intermittently moved between a plurality of measurement points two-dimensionally arranged on a sample placed on the sample stage with the first direction as a main movement direction, and perform mass spectrometry at each of a plurality of the measurement points.

In the mass spectrometry method according to Clause 1 and the mass spectrometer according to Clause 2, mass spectrometry is performed using the mass spectrometer including the first moving mechanism configured to move a sample stage in the first direction in a plane parallel to the sample stage and the second moving mechanism configured to move the first moving mechanism in the second direction different from the first direction in the plane parallel to the sample stage. In the mass spectrometry method according to Clause 1 and the mass spectrometer according to Clause 2, by mean of the first moving mechanism, an irradiation point of an excitation beam is intermittently moved between a plurality of measurement points two-dimensionally arranged on a sample placed on the sample stage with the first direction as the main movement direction, and mass spectrometry is performed at each of a plurality of the measurement points. That is, after mass spectrometry is performed at a measurement start point, by moving the sample stage in the first direction with the first moving mechanism, operation of moving an irradiation point of an excitation beam from the measurement start point to a measurement point adjacent in the main movement direction to perform mass spectrometry is repeatedly performed. When mass spectrometry at a last measurement point in the main movement direction is completed, by mean of the second moving mechanism, the sample stage is moved to the other direction of the two-dimensional arrangement (sub movement direction), and measurement is performed at a measurement point adjacent to the last measurement point. After the above, mass spectrometry of each measurement point is performed again along the main movement direction.

The second moving mechanism moves both the sample stage and the first moving mechanism. In contrast, the first moving mechanism moves only the sample stage and the load during the movement is small. Vibration generated when the sample stage is stopped is smaller when the sample stage is moved in the first direction than when the sample stage is moved in the second direction. Therefore, even if acceleration is increased during movement of the sample stage in the first direction, vibration when the sample stage is stopped during movement between measurement points is suppressed to be small, and the irradiation position of an excitation beam is hardly shifted. Thus, the imaging mass spectrometry can be speeded up while spatial resolution of the imaging mass spectrometry is maintained.

Clause 3

In the mass spectrometer according to Clause 2, acceleration when the sample stage is moved by the first moving mechanism is larger than acceleration when the sample stage is moved by the second moving mechanism.

While an object to be moved by the first moving mechanism is only the sample stage, objects to be moved by the second moving mechanism are the sample stage and the first moving mechanism, and the latter is heavier. In the mass spectrometer described in Clause 3, acceleration when the sample stage is moved in the first direction (main movement direction) by the first moving mechanism is made larger than acceleration when the sample stage is moved in the second direction by the second moving mechanism. In this manner, time required for movement of the sample stage in the first direction (main movement direction) can be shortened, and vibration generated when the sample stage moves in the second direction can be suppressed.

Since the number of times of movement of the sample stage in the second direction is smaller than the number of times of movement in the first direction (main movement direction), even if acceleration at the time of moving the sample stage in the second direction is suppressed to be lower than acceleration at the time of moving the sample stage in the first direction, influence on entire execution time of mass spectrometry can be suppressed to be small. Note that the mass spectrometer described in Clause 3 may satisfy the above requirement by using different configurations for the first moving mechanism and the second moving mechanism, or may satisfy the above requirement by using the same configuration for the first moving mechanism and the second moving mechanism and transmitting control signals in different forms from the measurement control unit.

Clause 4

In the mass spectrometer according to Clause 2 or Clause 3, the excitation beam optical system includes a laser light source that emits laser light and a condenser lens that condenses laser light emitted from the laser light source.

Among excitation beams, laser light can be condensed particularly to a small diameter, and the mass spectrometer described in Clause 2 or Clause 3 can be suitably used in a case of performing mass spectrometry with high spatial resolution using laser light condensed to a small diameter as in the mass spectrometer described in Clause 4.

Clause 5

In the mass spectrometer according to Clause 4, a condensing diameter of laser light by the condenser lens is 5 μm or less.

The mass spectrometer described in Clause 4 can be particularly suitably used in a device that performs imaging mass spectrometry of high spatial resolution using laser light condensed to a diameter of 5 μm or less like the mass spectrometer described in Clause 5.

Clause 6

In the mass spectrometer according to Clause 4 or Clause 5, the sample is mixed with a matrix substance that absorbs the laser light.

Recently, an imaging mass spectrometer using the matrix assisted laser desorption/ionization (MALDI) method is widespread. In a laser ionization method including MALDI, in order to acquire highly reliable data, usually, irradiation of laser light and mass spectrometry are performed several tens to several hundreds of times at each measurement point, a plurality of pieces of mass spectrum data are acquired for each measurement point, and processing such as integration and averaging are performed. In recent years, a frequency of laser in an ultraviolet region suitable for MALDI is rapidly increased, and an ultraviolet semiconductor laser capable of operating at a high repetition frequency of several tens of kHz has appeared. Further, in a mass spectrometry unit, a speed of analysis is increased, and mass spectrometry of several tens of measurement points per second is possible. By using these, it is becoming possible to analyze an entire sample section (20 to 30 mm square) with high spatial resolution of 5 μm or less in realistic time. That is, the mass spectrometer described in Clause 4 or Clause 5 can be suitably used as a device that ionizes a sample by the MALDI method and performs imaging mass spectrometry as described in Clause 6.

Clause 7

The mass spectrometer according to any one of Clause 2 or Clause 6 further includes a third moving mechanism configured to move the second moving mechanism in a third direction non-parallel to a sample-carrying surface of the sample stage.

In the mass spectrometer of Clause 7, for example, a distance between an excitation beam optical system and the sample stage is changed, and the distance can be adjusted so as to focus an excitation beam on a surface of a sample placed on the sample stage.

REFERENCE SIGNS LIST

1 . . . Imaging Mass Spectrometer
10 . . . Ionization Unit
11 . . . Laser Light Source
12 . . . Reflecting Minor
13 . . . Condenser Lens
14 . . . Sample Stage
15 . . . Stage Moving Mechanism
151 . . . First Linear Guide
152 . . . Second Linear Guide
153 . . . Third Linear Guide
16 . . . Microscope
17 . . . Opening
19 . . . Housing
20 . . . Mass Spectrometry Unit
21 . . . Opening
30 . . . Control and Processing Unit
31 . . . Storage Unit
32 . . . Mass Spectrometry Software
321 . . . Measurement Control Unit
322 . . . Measurement Point Setting Unit
323 . . . Imaging Mass Spectrometry Data Creation Unit
40 . . . Input Unit
50 . . . Display Unit

The invention claimed is:

1. A mass spectrometry method using a mass spectrometer including a first moving mechanism configured to move a sample stage in a first direction in a plane parallel to the sample stage and a second moving mechanism configured to move the first moving mechanism in a second direction different from the first direction in a plane parallel to the sample stage, the mass spectrometry method comprising:

moving the sample stage in the first direction with the first moving mechanism to cause an irradiation point of excitation beam to be intermittently moved between a plurality of measurement points two-dimensionally arranged on a sample placed on the sample stage with the first direction as a main movement direction, and performing mass spectrometry at each of the plurality of measurement points; and accelerating the sample stage when the sample stage is moved by the first moving mechanism is larger than accelerating the sample stage when the sample stage is moved by the second moving mechanism.

2. A mass spectrometer comprising:

a sample stage on which a sample is placed;

a first moving mechanism configured to move the sample stage in a first direction in a plane parallel to the sample stage;

a second moving mechanism configured to move the first moving mechanism in a second direction different from the first direction in a plane parallel to the sample stage;

an excitation beam optical system configured to irradiate the sample stage with an excitation beam; and a measurement control unit configured to move the sample stage in the first direction with the first moving mechanism to cause an irradiation point of the excitation beam to be intermittently moved between a plurality of measurement points two-dimensionally arranged on a sample placed on the sample stage with the first direction as a main movement direction, and perform mass spectrometry at each of the plurality of measurement points, wherein accelerating the sample stage when the sample stage is moved by the first moving mechanism is larger than accelerating the sample stage when the sample stage is moved by the second moving mechanism.

3. The mass spectrometer according to claim 2, wherein the excitation beam optical system includes a laser light source that emits laser light and a condenser lens that condenses laser light emitted from the laser light source.

4. The mass spectrometer according to claim 3, wherein a condensing diameter of laser light by the condenser lens is 5 μm or less.

5. The mass spectrometer according to claim 3, wherein the sample is mixed with a matrix substance that absorbs the laser light.

6. The mass spectrometer according to claim 2, further comprising a third moving mechanism configured to move the second moving mechanism in a third direction non-parallel to a sample-carrying surface of the sample stage.

* * * * *